(12) United States Patent
Schlossarczyk et al.

(10) Patent No.: US 6,857,402 B2
(45) Date of Patent: Feb. 22, 2005

(54) TWO-STROKE ENGINE

(75) Inventors: Jörg Schlossarczyk, Winnenden (DE); Werner Geyer, Berglen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 10/414,012

(22) Filed: Apr. 16, 2003

(65) Prior Publication Data

US 2003/0200941 A1 Oct. 30, 2003

(30) Foreign Application Priority Data

Apr. 24, 2002 (DE) .......................................... 102 18 200

(51) Int. Cl.$^7$ ................................................ F02B 33/04
(52) U.S. Cl. ................................................ 123/73 PP
(58) Field of Search .................... 123/73 A, 73 R, 123/73 PP, 65 A, 65 P

(56) References Cited

U.S. PATENT DOCUMENTS 6,289,856 B1 * 9/2001 Noguchi .................. 123/73 PP
6,491,005 B2 * 12/2002 Bergmann et al. ........ 123/73 R

FOREIGN PATENT DOCUMENTS

WO    WO 01/51785    7/2001

* cited by examiner

Primary Examiner—Tony M. Argenbright
Assistant Examiner—Hyder Ali
(74) Attorney, Agent, or Firm—Walter Ottesen

(57) ABSTRACT

A two-stroke engine, (1) is disclosed which includes (I) transfer channels (15, 15', 15", 16, 16', 16") which open into the crankcase (8) and fluidly connect the crankcase (8) to the combustion chamber (3) at specific positions of the piston (4) and (ii) an intake channel (11) for supplying an air/fuel mixture into the crankcase (8) via an inlet (9) and is connected to an air filter (13). At least one air channel (12) supplies additional combustion air into at least one transfer channel (15, 15', 15", 16, 16', 16"). For a good load-independent air/fuel mixture ratio, the length (a) of the intake channel (11) is up to 60% of the length (b) of the clean air path; and, length (b) is the mean channel length from the air filter (13) to the opening (19, 20) of a transfer channel (15, 16) into the crankcase (8).

10 Claims, 2 Drawing Sheets

TWO-STROKE ENGINE

BACKGROUND OF THE INVENTION

U.S. Pat. No. 6,668,770, it is known to configure air path and mixture path approximately the same length. The length of the mixture path should lie between 0.6 times and 1.4 times the length of the air path. In this way, air path and mixture path are to be matched to each other in order to maintain the air/fuel ratio constant, independent of load fluctuations.

The air path includes the length of the transfer channels. Since the mixture path should be approximately as long as the air path, unfavorable spatial conditions result because the mixture path must be configured comparatively long compared to the portion of the air path lying outside of the cylinder. Here, it has been shown that the air/fuel ratio in the combustion chamber is not optimal for the entire operating rpm range for air and mixture channels having approximately the same length.

SUMMARY OF THE INVENTION

It is an object of the invention to provide a two-stroke engine which has a favorable air/fuel ratio in the combustion chamber matched to the particular load.

The two-stroke engine of the invention is an engine for a portable handheld work apparatus. The two-stroke engine includes: a cylinder; a piston mounted in the cylinder to undergo a reciprocating movement; the cylinder and the piston conjointly defining a combustion chamber; a crankcase connected to the cylinder; a crankshaft rotatably journalled in the crankcase; a connecting rod connecting the piston to the crankshaft to permit the piston to drive the crankshaft in rotation as the piston reciprocates in the cylinder; a plurality of transfer channels fluidly connecting the crankcase to the combustion chamber at pregiven positions of the piston; the transfer channels opening into the crankcase with respective channel openings; an air filter and a carburetor; an intake channel for supplying an air/fuel mixture through an inlet into the crankcase; the intake channel being connected to the air filter and the carburetor defining a segment of the intake channel; an air channel extending from the air filter to supply essentially fuel-free combustion air to at least one of the transfer channels; the intake channel having a first length (a) measured from the air filter to the inlet; a clean air path having a second length (b) which is a mean channel length from the air filter to the channel opening of one of the transfer channels into the crankcase; and, the first length (a) being up to approximately 60% of the second length (b).

A good dynamic performance of the two-stroke engine results when the length of the intake channel from the air filter to the inlet into the crankcase amounts only to approximately 60% of the length of the clean air path. The length of the clean air path is the mean channel length from the air filter to the entry opening of the transfer channels into the crankcase. By configuring the intake channel shorter than the clean air path, there results furthermore a favorable structural configuration. Air channel and intake channel can be connected especially to an air filter.

According to a feature of the invention, the length of the intake channel is more than 20% of the length of the clean air path. For a favorable air/fuel ratio and therefore low exhaust-gas values, the resistance-relevant area in the clean air path corresponds purposefully to 1.7 times to 5.0 times the resistance-relevant area of the intake channel. Preferably, the area is approximately twice as large. The resistance-relevant area is especially the narrowest cross section in the clean air path or in the intake channel. The ratio of the resistance-relevant area of the clean air path to the length of the clean air path corresponds approximately to the ratio of the resistance-relevant area of the intake channel to the length of the intake channel. The ratio of resistance-relevant area to the length is therefore constant for clean air path and mixture path. The same Helmholtz frequency results for mixture path and clean air path in accordance with the Helmholtz equation pursuant to the formula:

$$f = \frac{c}{2\pi} \cdot \sqrt{\frac{A}{L \cdot V}}$$

wherein:
c is the sonic velocity; A is the resistance-relevant area; L is the length and V is the crankcase volume. The clean air path and mixture path are thereby matched to the same frequency characteristic. The two-stroke engine therefore has a good dynamic performance.

For a good scavenging result, the two-stroke engine has four transfer channels arranged symmetrically to a center symmetry plane. Two transfer channels are assigned to each piston window. The air channel advantageously bifurcates into two component channels in the region of the cylinder. Each component channel is connected to a piston window in specific piston positions. It is practical to provide two air channels and each air channel is connected to a piston window in specific piston positions. Advantageously, for a symmetric scavenging pattern, the resistance-relevant area of each air channel is approximately the same size.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
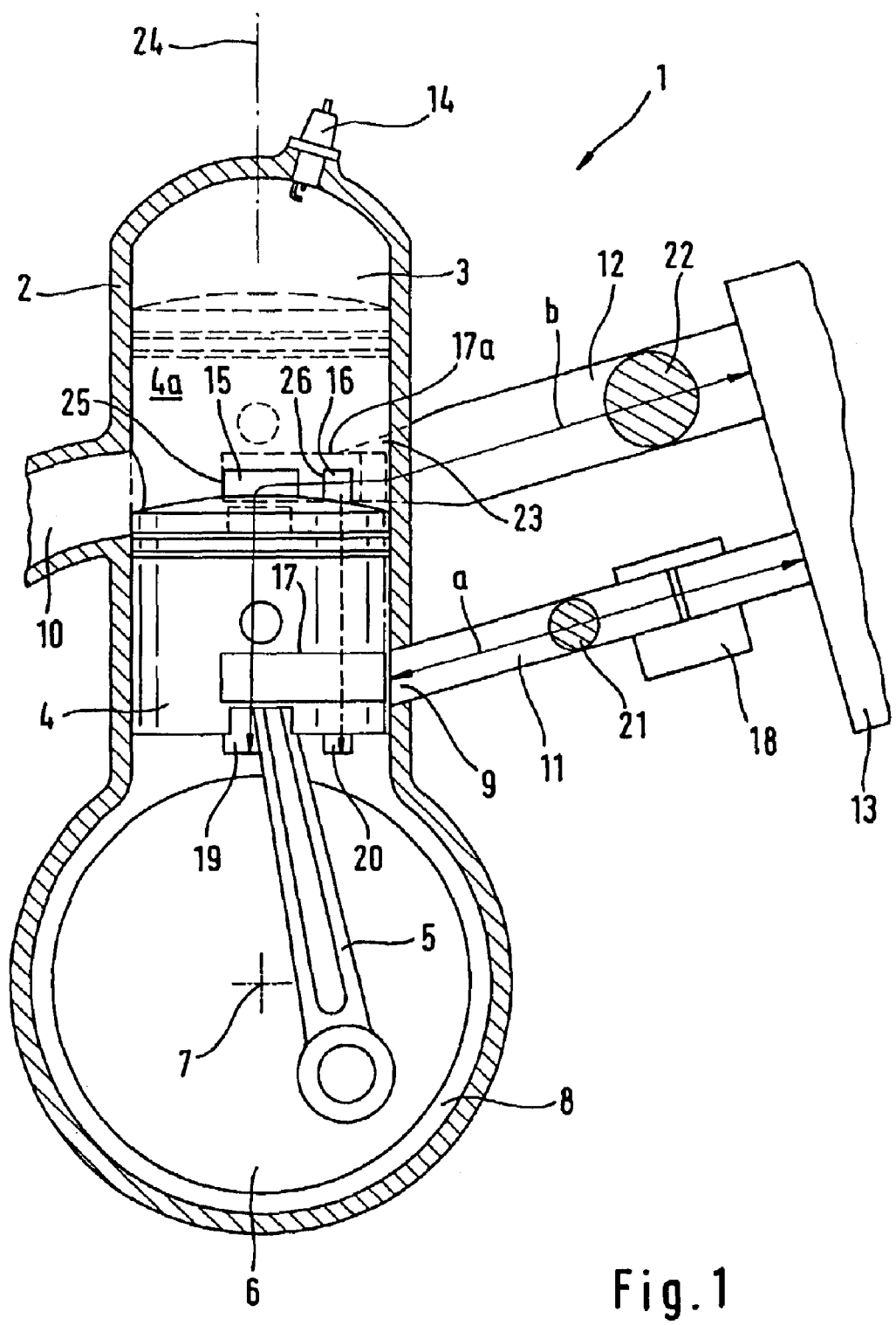
FIG. 1 is a schematic representation of a two-stroke engine in longitudinal section; and, FIG. 2 is a schematic representation of a section through a two-stroke engine at the elevation of the outlet.

The two-stroke engine 1 shown in FIG. 1 includes a cylinder 2 having a cylinder longitudinal axis 24 and a combustion chamber 3 configured in the cylinder 2. The combustion chamber 3 is delimited by an upwardly and downwardly moving piston 4 which is shown with broken lines in its upper position 4a close to top dead center (TDC). The piston 4 drives a crankshaft 6 via a connecting rod 5 and the crankshaft 6 is journalled in the crankcase 8 so as to be rotatable about the crankshaft axis 7. An air/fuel mixture is supplied to the crankcase 8 from the intake channel 11 through the inlet 9. The intake channel 11 is connected to an air filter 13 and is formed in a carburetor 18 over a segment of its length. The two-stroke engine 1 includes overall four transfer channels 15 and 16, which are arranged symmetrically to a center plane. Two transfer channels 15 are arranged to be outlet near and two transfer channels 16 are arranged to be outlet remote. The transfer channels (15, 16) open with openings (19, 20) into the crankcase 8 and with inlet windows (25, 26) into the combustion chamber 3. At pregiven piston positions as shown by the position of piston 4 in FIG. 1, crankcase 8 and combustion chamber 3 are fluidly connected to each other via the transfer channels (15, 16).

Two windows 17, which are arranged symmetrically to the cylinder center plane, are provided in the periphery of the piston 4. Only one of the windows 17 is shown in FIG. 1. In the position 4a of the piston shown with the broken line in FIG. 1, the piston window, which is identified in this position by 17a, connects an air channel 12 to the inlet windows (25, 26) of the transfer channels (15, 16). The air channel 12 is connected to the air filter 13. A throttle element can be mounted in the air channel 12 downstream of the air filter 13. This throttle element is coupled to the throttle flap of the carburetor 18. The air channel 12 bifurcates into two component channels 23 in the region of the cylinder 2 and these two component channels 23 are purposefully symmetrically configured. Advantageously, each component channel 23 opens in the region of a piston window 17a in the position of the piston shown.

The resistance-relevant area 22 of the air channel 12 is the area having the smallest cross section relevant for the throughflow. The length (b) of the clean air path is made up of the following: the length of the air channel 12 from the air filter 13 to the piston window 17; the mean length in the piston window 17 to the inlet windows (25, 26) of the transfer channels (15, 16); and, the mean length of the transfer channels (15, 16) up to the openings (19, 20). The path through the transfer channel 16 is shorter than the path through the transfer channel 15. For this reason, the arithmetic mean of the two lengths is considered for the length (b). For emphasis, the length (b) is shown by a broken line in the transfer channel 16. For determining the resistance-relevant area 22, the transfer channels 15 and 16, which are arranged in parallel in the flow path, are considered in common. The length (a) of the intake channel 11 identifies the length of the intake channel from the air filter 13 to the inlet 9 into the crankcase 8. The resistance-relevant cross section 21 of the intake channel 11 characterizes the smallest cross section in the intake channel relevant for the throughflow.

During operation of the two-stroke engine 1, an air/fuel mixture is drawn by suction from the intake channel 11 through the inlet 9 into the crankcase 8 during the upward movement of the piston 4 in the direction of TDC, that is, from the crankcase 8 in the direction toward the combustion chamber 3. This mixture is compressed in the crankcase 8 during the downward movement of the piston 4 in the direction of bottom dead center (BDC). As soon as the inlet windows 25 and 26 of the transfer channels 15 and 16 are cleared by the piston 4, the air/fuel mixture is moved from the crankcase 8 into the combustion chamber 3. With a renewed upward stroke of the piston 4, the air/fuel mixture in the combustion chamber 3 is compressed and is ignited by the spark plug 14. The exhaust gases are discharged from the combustion chamber after opening of the outlet 10. While the exhaust gases leave the combustion chamber 3 through the outlet 10, a new air/fuel mixture already flows through the transfer channels (15, 16 ) into the combustion chamber 3. In order to prevent that the fresh air/fuel mixture escapes from the combustion chamber 3, a low-fuel or fuel-free gas, such as air, is stored ahead of the fresh mixture. For this purpose, the inlet windows 25 and 26 of the transfer channels 15 and 16 are connected in the region of top dead center via the piston window 17 to the air channel 12 during the intake stroke. Substantially fuel-free combustion air flows through the air channel 12 into the transfer channels 15 and 16. This clean air is stored ahead of the air/fuel mixture from the crankcase 8 and flows laterally ahead of the mixture into the combustion chamber so that the air separates the mixture from the exhaust gases.

The clean air path and the intake channel 11 must be matched to one another for an optimal air/fuel ratio in the combustion chamber 3 over the entire rpm range. For this purpose, the length (a) of the intake channel 11 is more than 20% and up to 60% of the length (b) of the clean air path. A favorable air/fuel ratio in the combustion chamber results when the resistance-relevant area 22 in the clean air path corresponds to 1.7 times to 5.0 times the resistance-relevant area 21 of the intake channel 11. Advantageously, the resistance-relevant area 22 of the clean air path is approximately twice as large as the resistance-relevant area 21 of the intake channel 11. For a good dynamic match, the ratio of the resistance-relevant area 22 of the clean air path to the mean length (b) of the clean air path corresponds approximately to the ratio of the resistance-relevant area 21 of the intake channel 11 to the length (a) of the intake channel 11. The Helmholtz frequency is therefore equal in intake channel and clean air path. If the resistance-relevant area 22 of the clean air path is, for example, twice as large as the resistance-relevant area 21 of the intake channel 11, then twice the length (a) of the intake channel 11 results for the length (b) of the clean air path.

Figure 2:
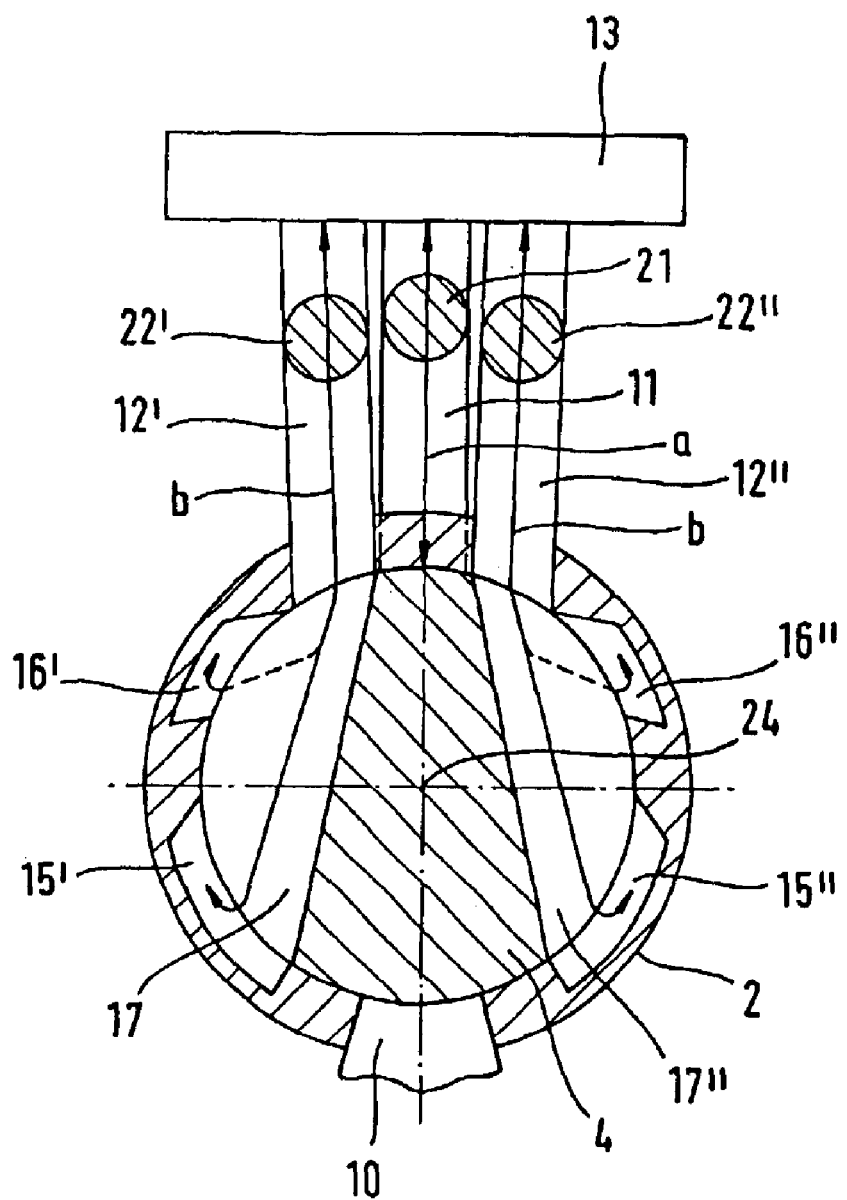

In FIG. 2, an embodiment is schematically shown in section perpendicular to the cylinder longitudinal axis 24 approximately at the elevation of the outlet 10. The piston 4 has two piston windows 17' and 17" which lie opposite to each other and are arranged symmetrically. In the illustrated piston position, piston window 17' connects an air channel 12' to two transfer channels (15', 16') and piston window 17" connects an air channel 12" to two transfer channels (15", 16"). The resistance-relevant area 22 of the clean air path is made up of: the resistance-relevant area 22' of air channel 12' and the resistance-relevant area 22" of the air channel 12". The resistance-relevant area 22' characterizes the narrowest cross section over the length of the clean air path and therefore this area can be measured in the piston window 17' or in the transfer channels (15', 16') and the resistance-relevant area 22" characterizes the narrowest cross section over the length of the clean air path and can therefore be measured also in the piston window 17" or in the transfer channels (15", 16"). A symmetrical scavenging pattern results in the combustion chamber 3 when the resistance-relevant area 22' and the resistance-relevant area 22" are the same size. The length (b) of the clean air path extends from the air filter 13 along the air channel 12' through the piston window 17' and along the transfer channels 15' and 16' up to the opening 19 (FIG. 1) in the crankcase 8 and from the air filter 13 along the air channel 12" through the piston window 17" and along the transfer channels 15" and 16" up to the opening 20 (FIG. 1) in the crankcase 8 (not shown in FIG. 2).

The intake channel 11 is configured over a longitudinal segment partially in a carburetor 18 (FIG. 1) not shown in FIG. 2. The intake channel 11 extends with the length (a) from the air filter 13 up to the crankcase 8 (FIG. 1). The length (a) of the intake channel 11 amounts to approximately 20% to 60% of the length (b) of a clean air path.

It can be advantageous that the air channel opens via a valve into one or several transfer channels. Advantageously, the opening of the air channel into a transfer channel lies in the region of an inlet window in order to achieve a complete filling of the transfer channels. It can be advantageous to connect only two of the four transfer channels to an air channel, preferably the transfer channels (15', 15") which are arranged near the outlet.

It is understood that the foregoing description is that of the preferred embodiments of the invention and that various changes and modifications may be made thereto without departing from the spirit and scope of the invention as defined in the appended claims.

What is claimed is:

1. A two-stroke engine including an engine for a portable handheld work apparatus including motor-driven chain saws, cutoff machines, the two-stroke engine comprising:
   a cylinder;
   a piston mounted in said cylinder to undergo a reciprocating movement;
   said cylinder and said piston conjointly defining a combustion chamber;
   a crankcase connected to said cylinder;
   a crankshaft rotatably journalled in said crankcase;
   a connecting rod connecting said piston to said crankshaft to permit said piston to drive said crankshaft in rotation as said piston reciprocates in said cylinder;
   a plurality of transfer channels fluidly connecting said crankcase to said combustion chamber at pregiven positions of said piston;
   said transfer channels opening into said crankcase with respective channel openings;
   an air filter and a carburetor;
   an intake channel for supplying an air/fuel mixture through an inlet into said crankcase;
   said intake channel being connected to said air filter and said carburetor defining a segment of said intake channel;
   an air channel extending from said air filter to supply essentially fuel-free combustion air to at least one of said transfer channels;
   said intake channel having a first length (a) measured from said air filter to said inlet;
   a clean air path having a second length (b) which is a mean channel length from said air filter to the channel opening of one of said transfer channels into said crankcase; and,
   said first length (a) being up to 60% of said second length (b).

2. The two-stroke engine of claim 1, wherein said first length (a) is more than 20% of said second length (b).

3. The two-stroke engine of claim 1, wherein said plurality of transfer channels are four in number and are symmetrically arranged.

4. A two-stroke engine including an engine for a portable handheld work apparatus including motor-driven chain saws, cutoff machines, the two-stroke engine comprising:
   a cylinder;
   a piston mounted in said cylinder to undergo a reciprocating movement;
   said cylinder and said piston conjointly defining a combustion chamber;
   a crankcase connected to said cylinder;
   a crankshaft rotatably journalled in said crankcase;
   a connecting rod connecting said piston to said crankshaft to permit said piston to drive said crankshaft in rotation as said piston reciprocates in said cylinder;
   a plurality of transfer channels fluidly connecting said crankcase to said combustion chamber at pregiven positions of said piston;
   said transfer channels opening into said crankcase with respective channel openings;
   an air filter and a carburetor;
   an intake channel for supplying an air/fuel mixture through an inlet into said crankcase;
   said intake channel being connected to said air filter and said carburetor defining a segment of said intake channel;
   an air channel extending from said air filter to supply essentially fuel-free combustion air to at least one of said transfer channels;
   said intake channel having a first length (a) measured from said air filter to said inlet;
   a clean air path having a second length (b) which is a mean channel length from said air filter to the channel opening of one of said transfer channels into said crankcase; and,
   said first length (a) being up to approximately 60% of said second length (b),
   wherein said clean air path has a first resistance-relevant area and said intake channel has a second resistance-relevant area and said first resistance-relevant area corresponds to 1.7 to 5.0 times said second resistance-relevant area.

5. The two-stroke engine of claim 4, wherein said first resistance-relevant area is approximately twice said second resistance-relevant area.

6. The two-stroke engine of claim 4, wherein the ratio of said first resistance-relevant area to said second length (b) corresponds approximately to the ratio of said second resistance-relevant area to said first length (a).

7. A two-stroke engine including an engine for a portable handheld work apparatus including motor-driven chain saws, cutoff machines, the two-stroke engine comprising:
   a cylinder;
   a piston mounted in said cylinder to undergo a reciprocating movement;
   said cylinder and said piston conjointly defining a combustion chamber;
   a crankcase connected to said cylinder;
   a crankshaft rotatably journalled in said crankcase;
   a connecting rod connecting said piston to said crankshaft to permit said piston to drive said crankshaft in rotation as said piston reciprocates in said cylinder;
   a plurality of transfer channels fluidly connecting said crankcase to said combustion chamber at pregiven positions of said piston;
   said transfer channels opening into said crankcase with respective channel openings;
   an air filter and a carburetor;
   an intake channel for supplying an air/fuel mixture through an inlet into said crankcase;
   said intake channel being connected to said air filter and said carburetor defining a segment of said intake channel;
   an air channel extending from said air filter to supply essentially fuel-free combustion air to at least one of said transfer channels;
   said intake channel having a first length (a) measured from said air filter to said inlet;
   a clean air path having a second length (b) which is a mean channel length from said air filter to the channel opening of one of said transfer channels into said crankcase;
   said first length (a) being up to approximately 60% of said second length (b); and said plurality of transfer channels being four in number and being symmetrically arranged, wherein said piston has two piston windows and each of said piston windows is assigned to two of said transfer channels.

8. The two-stroke engine of claim 7, wherein said air channel bifurcates into two component channels and each of said component channels is connected to one of said piston windows at pregiven positions of said piston.

9. The two-stroke engine of claim 7, wherein said air channel is a first air channel and said two-stroke engine further comprises a second air channel; and, said first and second air channels communicate with corresponding ones of said piston windows at pregiven positions of said piston.

10. The two-stroke engine of claim 9, wherein the resistance-relevant areas of said first and second air channels, respectively, are of equal size.

* * * * *

UNITED STATES PATENT AND TRADEMARK OFFICE
CERTIFICATE OF CORRECTION

PATENT NO. : 6,857,402 B2
DATED : February 22, 2005
INVENTOR(S) : Joerg Schlossarczyk and Werner Geyer It is certified that error appears in the above-identified patent and that said Letters Patent is hereby corrected as shown below:

Title page,
Item [57], ABSTRACT,
Line 1, delete "engine," and insert -- engine -- therefor.

Column 1,
Line 5, insert -- From -- before "U.S.".

Column 6,
Line 66, delete "un" and substitute -- up -- therefor.

Signed and Sealed this

Seventeenth Day of May, 2005

JON W. DUDAS
*Director of the United States Patent and Trademark Office*